United States Patent [19]

Buday

[11] Patent Number: 4,995,664
[45] Date of Patent: Feb. 26, 1991

[54] HITCH FOR MOTOR HOME ASSEMBLY

[75] Inventor: John M. Buday, Toronto, Canada

[73] Assignee: Continental Coach Ltd., Toronto, Canada

[21] Appl. No.: 378,642

[22] Filed: Jul. 12, 1989

Related U.S. Application Data

[63] Continuation-in-part of Ser. No. 89,500, Aug. 26, 1907, Pat. No. 4,848,731.

[51] Int. Cl.⁵ .............................................. B60P 3/34
[52] U.S. Cl. ................................. 296/165; 296/26; 292/33
[58] Field of Search ............ 296/26, 165; 280/415.1, 280/416.3, 785; 292/32, 33; 410/73, 76, 79, 90, 91

[56] References Cited

U.S. PATENT DOCUMENTS

| | | | |
|---|---|---|---|
| 1,222,549 | 4/1917 | Lark . | |
| 3,420,566 | 1/1969 | Obra | 296/23 |
| 3,586,119 | 6/1971 | Fullerton et al. | 180/14 |
| 3,638,983 | 2/1972 | Flourney et al. | 292/33 X |
| 3,692,332 | 9/1972 | Pappatheodoru | 280/423 |
| 3,817,545 | 6/1974 | Ward | 280/34 |
| 3,843,158 | 10/1974 | Schwellenbach | 280/403 |
| 4,241,948 | 12/1980 | Mori | 296/216 |
| 4,322,108 | 3/1982 | McPherson | 296/164 |
| 4,452,465 | 6/1984 | Bourke | 280/403 |
| 4,691,818 | 9/1987 | Weber | 197/666 |

FOREIGN PATENT DOCUMENTS

1112992 11/1955 France .
893368 4/1962 United Kingdom .

Primary Examiner—Dennis H. Pedder
Assistant Examiner—Joseph D. Pape
Attorney, Agent, or Firm—Welsh & Katz, Ltd.

[57] ABSTRACT

A motor home trailer unit and a self-contained van unit are close-coupled together as one rigid unitary assembly. Full access is provided between the van and the motor home trailer when close-coupled together, and the van is readily detached for use as a self-contained separate vehicle for travelling, towing a boat or the like. Connection is made by a coupling arrangement including two spaced apart and forward projecting connector guide elements adjacent each side of the trailer unit at the bottom and the top of the front end wall thereof, and corresponding spaced apart connector receptacles adjacent each side of the van unit at the bottom and the top of the rear end wall thereof. The connector guide elements are detachably engaged and locked within the receptacles by corresponding movable locking elements when the units are coupled in a rigid unitary assembly.

16 Claims, 5 Drawing Sheets

FIG. 16

HITCH FOR MOTOR HOME ASSEMBLY

CROSS-REFERENCE TO RELATED APPLICATION

This is a continuation-in-part application based upon my prior application, Ser. No. 089,500, filed on Aug. 26, 1987 and entitled "MOTOR HOME ASSEMBLY", now issued as U.S. Pat. No. 4,848,831 on July 18, 1989.

BACKGROUND OF THE INVENTION

The present invention relates to new and useful improvements in motor home assemblies. In particular, the present invention relates to a novel coupling means or hitch for a motor home assembly.

Conventional motor homes are usually self-contained and although suitable for many purposes, one of the main disadvantages is the fact that the entire unit has to be driven if it is desired to travel locally once a campground or other location has been reached.

This disadvantage of motor homes is only overcome conventionally by towing a small car behind the motor home for use when parked, but this is unsatisfactory and relatively expensive.

Relatively large trailers are often pulled by fifth wheel connections to a cab unit which means that the cab unit can be detached and used locally but this is not a particularly satisfactory solution, as these cab units are often relatively large and they do not provide any storage accommodation when separated from the trailer component.

The present invention overcomes disadvantages inherent with current motor home and large trailer facilities by providing a motor home assembly consisting of a van unit as a tow vehicle and a trailer or motor home unit which, when travelling as one assembly, is close-coupled to the van unit with a rigid connection so that it becomes, in effect, a complete motor home assembly.

When parked, the van component is easily detached and it can be used as a vehicle for local travel, having the storage capacity of a van. It also can be used to tow boats and trailer units therebehind. It will be appreciated that a conventional motor home cannot tow both a small car for local use and a boat and trailer unit at the same time.

Accessibility is maintained because of complete access between the van unit and the motor home unit when connected together. The assembly is easy to drive and handle, and it is comfortable to travel in. Because of the aerodynamic design of the coupled unit, superior gas mileage is obtainable compared to similar sized units.

One object of the present invention is, therefore, to provide a motor home assembly comprising in combination a four wheel drive vehicle unit having steerable front wheels and selectively steerable rear wheels, a motor home trailer unit including at least one pair of wheels, and means cooperating between said van unit and said motor home unit to selectively close-couple said units together as one rigid assembly in sealed relationship, one with the other.

Another object of the present invention is to provide a completely versatile motor home assembly which is easily separated into two units, thereby permitting the motor home component or unit to be parked at a permanent site while the towing van unit is available for use as a vehicle which can be used when not connected to the motor home unit, thereby saving the cost and inconvenience of a second vehicle.

It is a still further object of the present invention to provide a novel hitch or coupling assembly for releasably close-coupling the driven van unit and the motor home trailer unit together as one rigid assembly in sealed relationship, one with the other.

These and other objects of the present invention, as well as the advantages thereof, will become clear to those skilled in the art from the disclosure which follows.

SUMMARY OF THE INVENTION

In general, the invention of this continuation-in-part application is directed to a novel hitch or coupling assembly for releasably close-coupling a driven vehicle unit, such as a van unit, to a motor home trailer unit to provide a single rigid motor home assembly in a sealed relationship.

More particularly, the present invention relates to a four-point trailer coupling concept, wherein the trailer unit has a forward end wall adapted to nest with the rear end wall of a van-type vehicle. The trailer has four forwardly projecting guide elements or cones disposed generally adjacent the four corners of the nesting surface (the front end wall of the trailer unit) which are received within complementary holding recesses formed in the rear end wall of the vehicle unit. Generally, vertically disposed linear actuators are mounted internally of the vehicle rear end wall on laterally opposite sides thereof, each of the linear actuators including a pair of locking pins which are adapted for locking relationship with corresponding apertures in the forwardly projecting guide elements or cones on the trailer unit, so as to fixedly couple the trailer to the vehicle. The vehicle has steerable rear wheels to facilitate turning of the vehicle-trailer rigid combination. A four wheel drive is preferably utilized on the vehicle to assure that power is not lost in moving the coupled vehicle-trailer unit, in the event that one or more of the drive wheels loses contact with the road or ground surface.

Alternatively, the present invention also comprehends the foregoing description of the trailer hitch wherein the elements within the trailer are reversed to appear in the vehicle and the elements within the vehicle are reversed to appear in the trailer. In this embodiment, the vehicle unit has the four rearwardly projecting guide elements or cones disposed generally adjacent the four corners of the nesting surface (the rear end wall of the vehicle unit) which are received within complementary holding recesses formed in the forward end wall of the trailer unit. Generally vertically disposed linear actuators are mounted internally of the trailer unit inside of the forward end wall on laterally opposite sides thereof, each of the linear actuators including a pair of locking pins which are adapted for locking relationship with corresponding apertures in the rearwardly projecting guide elements or cones on the vehicle unit, so as to fixably couple the trailer unit and the vehicle unit together in a rigid assembly.

Accordingly, in one aspect, the present invention comprehends a vehicle-trailer assembly comprising a motor vehicle unit, preferably having a four wheel drive, including a rear end wall and having steerable front wheels and selectively steerable rear wheels; and a trailer unit including at least one pair of wheels and having a front end wall positioned adjacent the vehicle unit rear end wall. Cooperating coupling means between the vehicle unit and the trailer unit selectively close-couple the units together as one rigid assembly in sealed relationship, one with the other. The cooperating coupling means includes at least one projecting connection guide element adjacent each side of one of the units at the bottom of the wall thereof, and corresponding spaced apart connector receptacles or recesses adjacent each side of the other of the units at the bottom of the wall thereof. The connector guide elements are detachably engaged and locked within the connector receptacles by corresponding movable locking elements when the units are coupled in rigid assembly.

In a more preferred embodiment, the present invention comprehends a vehicle-trailer assembly comprising a motor vehicle unit, preferably having a four wheel drive, including a rear end wall and having steerable front wheels and selectively steerable rear wheels; and a trailer unit including at least one pair of wheels and having a front end wall positioned adjacent the vehicle unit rear end wall. Cooperating coupling means between the vehicle unit and the trailer unit selectively close-couple the units together as one rigid assembly in sealed relationship, one with the other. The cooperating coupling means includes at least two spaced apart and projecting connector guide elements adjacent each side of one of the units at the bottom and the top of the wall thereof, and corresponding spaced apart connector receptacles or recesses adjacent each side of the other of the units at the bottom and the top of the wall thereof. The connector guide elements are detachably engaged and locked within the connector receptacles by corresponding movable locking elements when the units are coupled in rigid assembly.

A clearer understanding of the present invention will be obtained from the disclosure which follows when read in the light of the accompanying drawings.

DESCRIPTION OF THE DRAWINGS

In the drawings, like characters of reference indicate corresponding parts in the different figures.

DETAILED DESCRIPTION OF THE PREFERRED EMBODIMENTS

Figure 1:
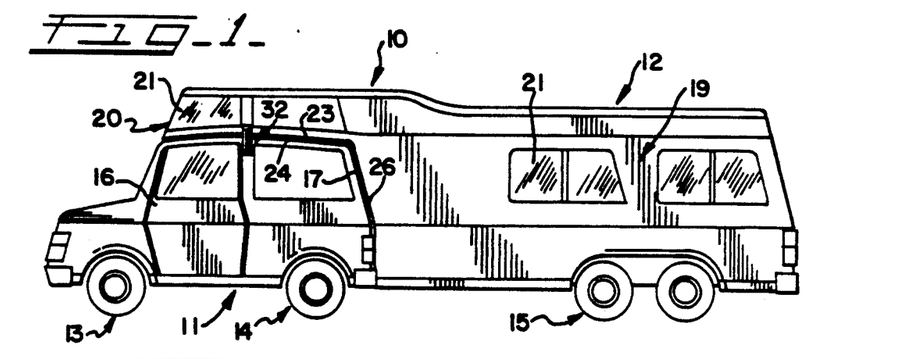
FIG. 1 is a side elevational view of a complete motor home assembly close-coupled together.

Proceeding therefore to describe the invention in detail, reference should first be made to FIG. 1 in which the mobile home assembly is collectively designated 10. The motor home assembly includes a vehicle, such as a van unit collectively designated 11, and a motor home trailer unit collectively designated 12.

Figure 2:
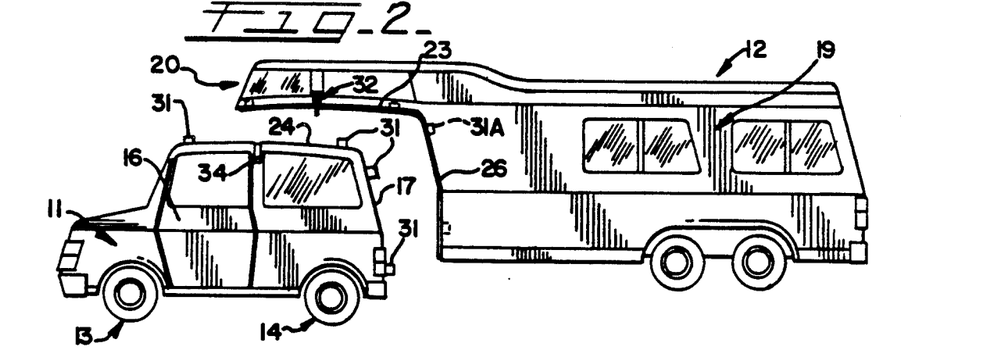
FIG. 2 is a view similar to FIG. 1, but showing the two units separated.

The van unit preferably is a four wheel drive unit having steerable front wheels 13 and rear wheels 14 which are selectively steerable. By this is meant that when the motor home trailer unit is connected to the van unit, it is necessary to have steerable rear wheels 14, but when the units are separated as shown in FIG. 2, the rear wheels can be locked in the straight ahead position. This is because, when the motor home unit 12 is secured to the van unit 11, it is in effect, one rigid vehicle with the motor home unit being supported by the van, as will hereinafter be described, and being provided with dual rear wheel assemblies collectively designated 15. Without steerable rear wheels 14 on the van unit, the entire close-coupled motor home assembly would not track correctly.

Vehicles having four wheel drive and steerable front wheel assemblies, with selectively steerable rear wheel assemblies, are manufactured by several companies so that it is not believed necessary to provide structural details of the selectively steerable rear wheel assemblies, nor of the method of locking up these wheels in the straight ahead position when required.

The van unit 11 also includes a body 16, the interior appointments of which may be as desired. The rear end wall 17 thereof may be provided with doors (FIG. 13) which may be removed and stored, or which may be folded inwardly, or which may consist of roll-type doors which either open and close from the sides or from the top, all of which constructions are well known in the art.

The van unit also includes a pair of spaced and parallel, longitudinally extending chassis frame members 117 (FIG. 4) which are in the form of hollow box frame members at least at the rear ends 17A (FIG. 5), the purpose of which will hereinafter be described.

The motor home or trailer unit 12 is also mounted on a pair of spaced and parallel longitudinally extending chassis members 18 (FIG. 4), and these are also hollow box frame members, at least at the front ends 18A (FIGS. 3 and 5), as will hereinafter be described. These chassis members support the aforementioned dual wheel assemblies 15 and the body portion collectively designated 19.

The body is preferably made of fiberglass of conventional construction and interior appointments, and the body 19 is provided with a forwardly extending upper portion collectively designated 20 (FIGS. 1 and 2) which is known as a "cab-over" configuration. Both the body 19 and the front portion 20 may be provided with windows 21 as is conventional.

Figure 3:
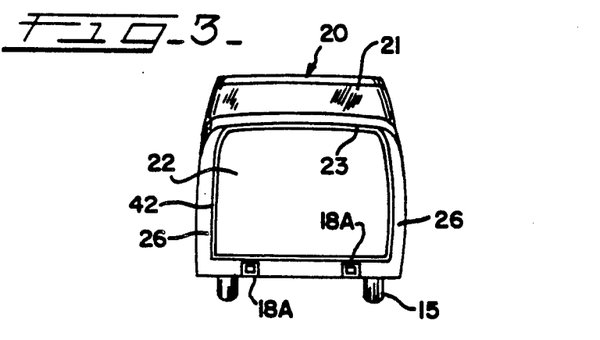
FIG. 3 is a front elevational view of the motor home trailer unit of FIGS. 1 and 2.

FIG. 3 shows a front elevation of the motor home or trailer unit with the front wall portion 22 being open and having a configuration adapted to mate with the rear wall 17 of the van unit.

When connected together, the profile of the front of the trailer unit 12 is similar to the profile of the body portion of the van unit which is engaged by the trailer unit, with the underside closed portion 23 of the forwardly extending portion 20 engaging upon the roof 24 of the van unit, and with the lower front wall 26 of the trailer unit having a configuration which is similar to the rear wall 17 of the van unit, so that they become integral when connected together, and due to the connections therebetween, which will hereinafter be described, become also a rigid one piece assembly.

Figure 11:
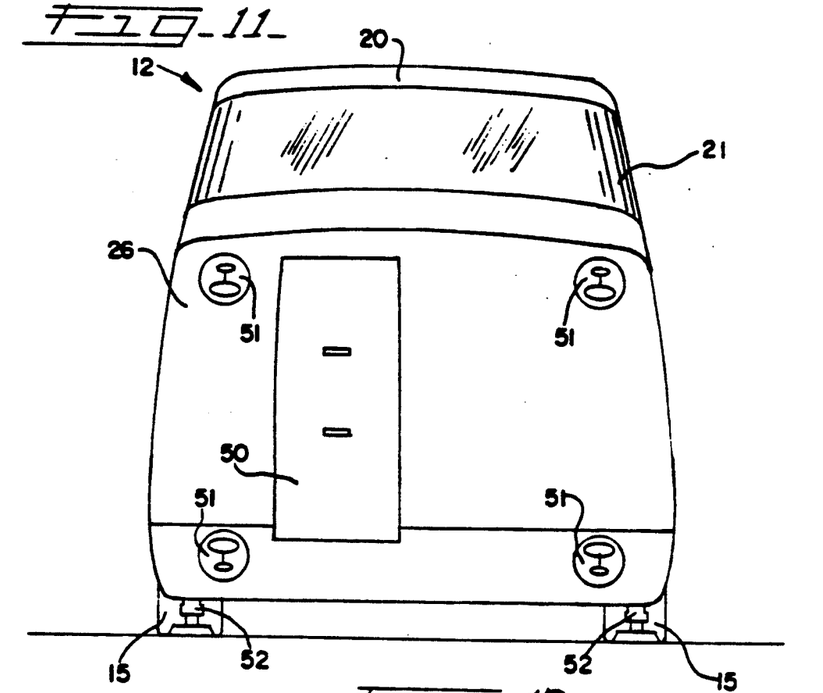
FIG. 11 is an elevational view of the forward end wall of the motor home trailer unit showing an embodiment containing alternate hitch or coupling means and a "pop-out" door panel.

The front wall 26 of the trailer unit is also open with the opening 22 mating with the opening at the rear of the van, and it may also be provided with closure means such as removable or folding doors or the like, as seen in FIG. 11, such closure being required of course when the two units are separated as shown in FIG. 2. However, normally they may remain open so that full access is provided between the van unit and the trailer unit when the units are coupled together as shown in FIG. 1.

Figure 4:
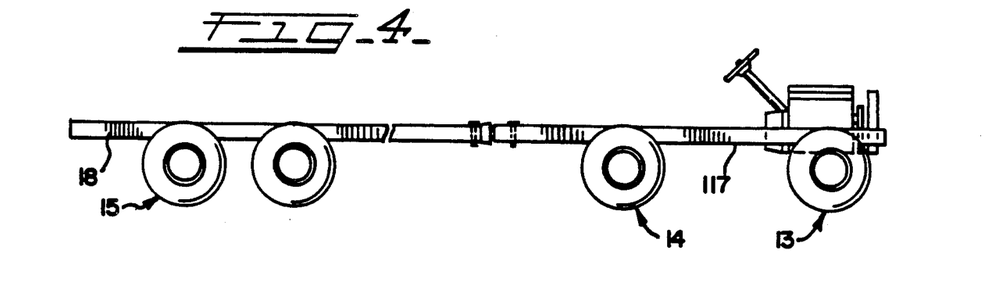
FIG. 4 is a schematic side elevational view of the chassis of FIG. 1 showing one embodiment of the connection between the two units.
Figures 5, 6, 7, 8, 9, 10:
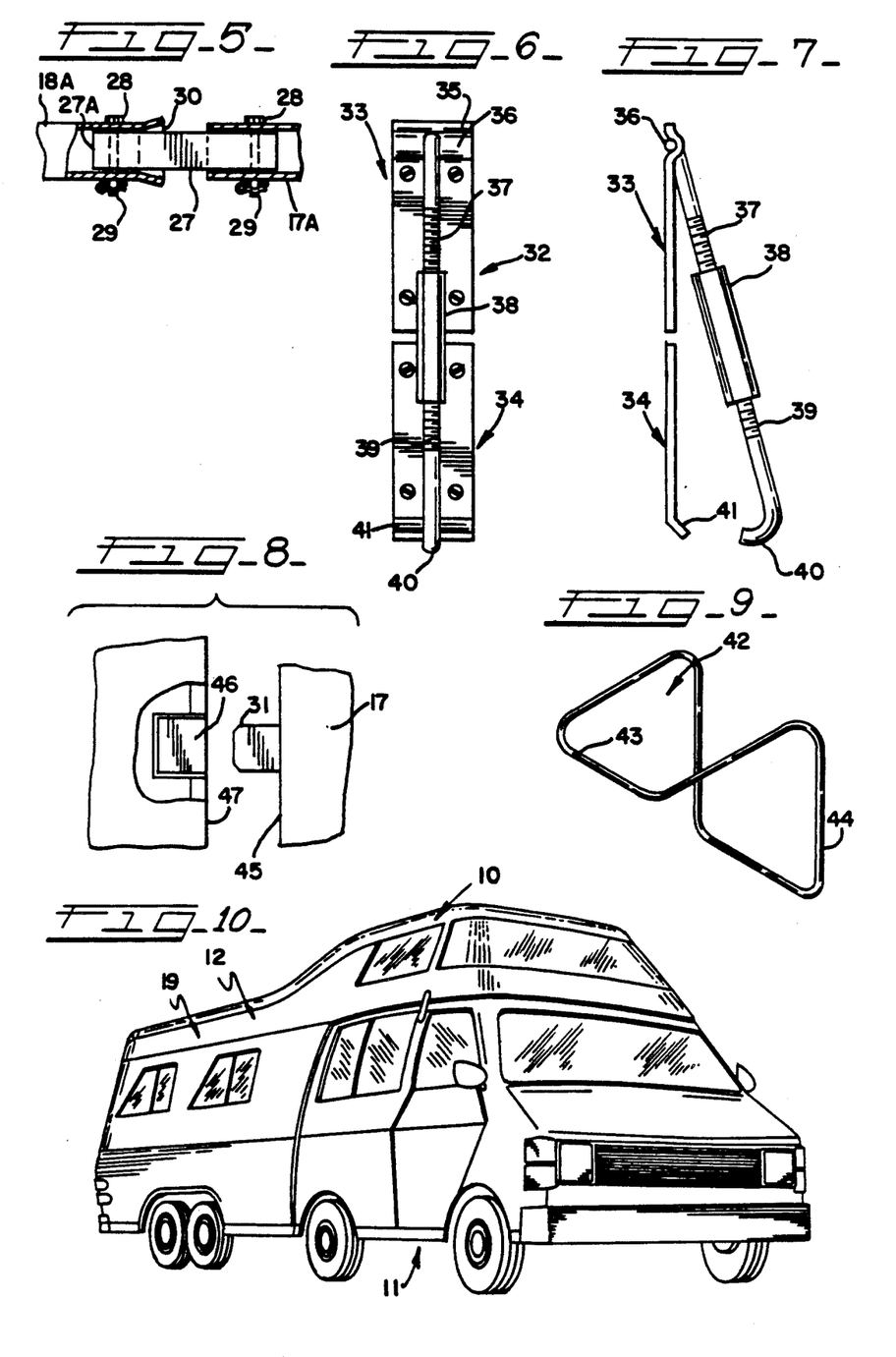
FIG. 5 is a fragmentary enlarged view showing the connection of FIG. 4 between the two units.
FIG. 6 is an enlarged front elevational of one of the latch assemblies shown in FIGS. 1 and 2.
FIG. 7 is a side elevational view of FIG. 6.
FIG. 8 is an enlarged fragmentary view showing one of the connecting plates between the two units of FIG. 2.
FIG. 9 is an isometric view of the sealing gasket utilized between the two units when connected together.
FIG. 10 is a perspective view of the complete motor home assembly of the subject invention showing the motor home trailer component connected to the driven vehicle unit.

Means are provided to detachably connect the two units together and reference should be made firstly to FIGS. 4, 5 and 8 in regard to a first connecting means. A second detachable coupling means or hitch will be discussed hereinafter in regard to FIGS. 11-17.

In regard to the first coupling means, refer now to FIG. 4. The main connection between the two units is between the corresponding ends of the longitudinal frame members 117 and 18, it being understood that the width and height of these corresponding frame members is substantially equal both on the van unit and on the trailer unit.

A connector 27, shown in FIG. 5, consists of an elongated, rectangular cross-section member having a cross-sectional configuration similar to the internal cross-sectional configuration of the chassis frame members, and it is slidable therein. One end of these connectors 27 engages the end 17a of the van frame members 117 and is detachably connected thereto by means of a pin 28 extending through apertures in the wall of the chassis member 17A and also through the engaged portion of the connector 27. Spring pins 29 detachably retain the connecting pins 28 in position.

The other ends 27A of these connectors may be tapered slightly to facilitate engagement into the corresponding trailer chassis ends 18A. These also may be detachably held in position by means of connecting pins 28 and spring pins 29.

Although the mating ends 17A and 18A of the chassis members 117 and 18 respectively are shown spaced apart in FIG. 5 for clarity, nevertheless, it will be appreciated that, when assembled, they will be relatively close together.

It is desirable that the distal end of the portion 18A of the chassis member be provided with a divergent throat 30 in order to facilitate the engagement of the connectors 27 when backing the van unit to the motor home trailer unit for connecting one with the other.

When connecting the van unit to the trailer unit, it is preferable that the connectors be engaged with the van unit by means of pins 29 and then the van unit may be backed into position to the front of the trailer unit with the ends 27A of the connectors entering the ends 18A of the connector receptacles formed on the ends of the trailer chassis members 18. Once in position, the pins 28 are inserted and spring pins 29 are engaged to prevent displacement of pins 28.

When moving to the engaged position, it should be noted that a plurality of metal plates 31 are provided around the periphery of the van and one of these plates is shown in FIG. 8. Reference character 31 also is shown in FIG. 2, indicating preferred locations of these plates, and it will be appreciated from FIG. 2 that there are four of such plates on each side of the van profile.

These plates are rectangular and extend rearwardly from the van profile 45 and they engage with resilient pads 46 provided at similar meeting locations around the profile 47 of the trailer unit, thus assisting in registering the van profile with the trailer profile.

At the same time, once engaged, latch assemblies 32 become aligned. These latch assemblies consist of two portions, a trailer portion 33 and a van portion 34 and these are shown in detail in FIGS. 6 and 7. The trailer portion 33 consists of a plate 35 secured to each side of the forwardly extending upper portion 20 adjacent the underside closed portion or lower edge 23. A pivot pin 36 supports a threaded rod 37 adjacent the upper end of plate 35, which in turn engages with a turn buckle 38, and a further screw-threaded rod 39 having a hooked lower end 40 is engaged with the turn buckle 38.

Portion 34 also consists of a plate secured to each of the upper sides 24 of the van body 16, and these plates have an out-turned lower edge portion 41 engageable by the hooked end 40 of rod 39, so that when the turnbuckle is tightened, it pulls the upper portion of the trailer downwardly into contact with the roof of the van.

A resilient rubber or synthetic polymer gasket collectively designated 42 is shown in FIG. 9, and it is secured to the profile of the front of the trailer unit by adhesive or the like. It consists of an upper substantially horizontal rectangular portion 43 which is secured around the periphery of the lower side 23 of the forwardly extending portion 21 of the trailer unit and a substantially vertical rectangular portion 44 which is secured around the frame or wall 26 defining the front opening 22 of the trailer unit, so that when the two units are connected together as aforesaid, they are not only rigidly connected but they are in sealable relationship with one another. This gasket provides an aerodynamic seal along the periphery of the face-to-face joint between the units, while a second gasket of rectangular shape (not shown in the Figures) provides a leakproof weather seal around the doors interconnecting the units.

It will, therefore, be appreciated that the close-coupled rigid assembly as shown in FIG. 1 is easily operated and steered with the steerable front and rear wheels 13 and 14 of the van unit. The close-coupled unit is shown in perspective in FIG. 10. The two units are easily attached and separated one from the other, thus leaving the van to be utilized as an independent vehicle once the motor home trailer unit is parked on location.

FIGS. 11-17 present a more particularly preferred embodiment of a trailer coupling device or hitch for the motor home assembly of the present invention.

Referring now to FIG. 11, there is shown the front view of the motor home trailer unit 12 showing the forwardly extending upper portion or cab-over configuration 20 of the trailer unit containing window 21. The lower front end wall 26 of the trailer is configured to mate with the van rear end wall 17, which is not shown in FIG. 11. Front wall 26 contains a removable "pop-out" trailer door panel 50 which is releaseably secured in front wall 26. In addition, the front wall 26 contains four trailer hitch conical guide elements or pins 51 which are located at the upper and lower corners of the front wall 26 adjacent each side wall. The rear end of the trailer unit, which is not shown, is supported by the dual rear wheels 15 on the motor home trailer, whereas the forward end of the trailer 12 is supported by a pair of jacks 52 located on each side of the trailer unit.

Figures 12, 13:
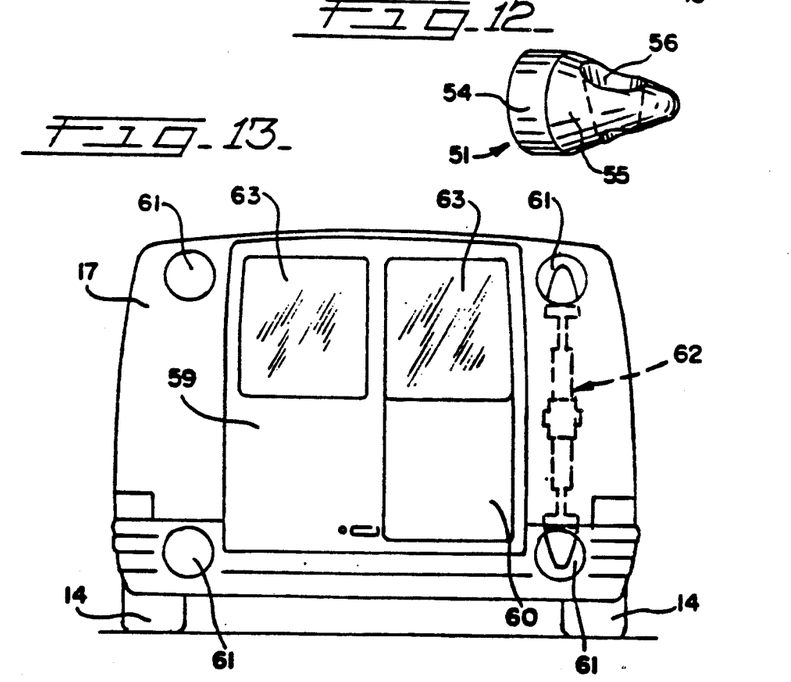
FIG. 12 is a perspective view of a conical guide pin for close-coupling the mobile home trailer unit of FIG. 11 to the driven vehicle unit.
FIG. 13 is an elevational view of the rear end wall of the driven vehicle unit showing a lift-up rear hatch and holding recesses for receiving the trailer conical guide pins of FIGS. 11 and 12.

FIG. 12 shows the configuration of the hitch guide pin 51 of FIG. 11. The guide pin 51 has a cylindrical rear portion 54 which is fixedly attached to the trailer vertical frame element which will be discussed hereinafter. The forward portion 55 of the guide pin 51 has a generally conical shape. Contained within the conical portion 55 is a locking receptacle or aperture 56. Preferably, locking receptacle 56 passes through the conical forward portion 55 of the guide pin, as shown. Preferably, the locking aperture 56 also has a conical configuration, as shown, although other shapes may be used.

FIG. 13 discloses the rear or trailing end wall 17 of the vehicle unit or van of the motor home assembly. The rear wall 17 contains a lift-up rear hatch 59 which is attached by spring loaded hinges, not shown, at the upper end of the lift-up rear hatch. The rear hatch 59 contains a removable "pop-out" door panel 60 on one side thereof. In addition, holding receptacles or recesses 61 are located at the bottom and at the top corners of the rear wall 17 adjacent the van side walls. The holding receptacles or recesses 61 are adapted to receive the trailer guide pins 51. On each side of the van unit, there is located a locking means 62 for locking the trailer guide pins 51 in the holding recesses 61, only one of which is shown on the right side of FIG. 13 as a dotted representation since it is located behind the van end wall 17. In addition, the rear end wall 17 of the van unit contains a pair of windows 63, one of which is located in the removable "pop-out" door panel 60.

Figure 14:
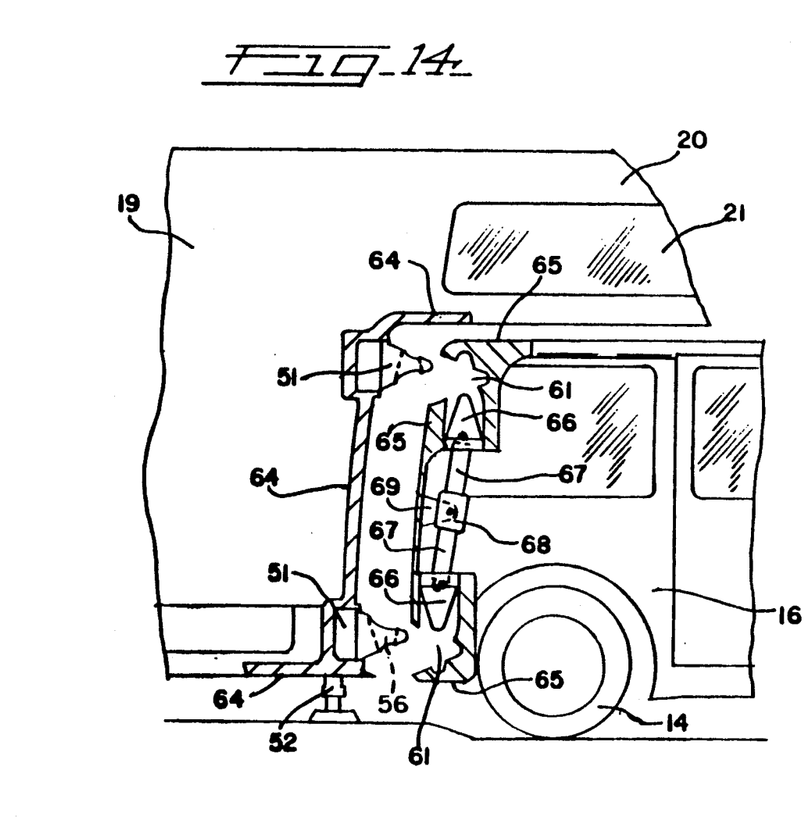
FIG. 14 is a simplified schematic cut-away elevational view of the rear portion of the driven vehicle unit and a forward portion of the motor home trailer unit before alignment and close-coupling.

FIG. 14 is a simplified schematic cut-away elevational view of the rear portion of the driven vehicle unit or van and a forward portion of the motor home trailer unit before alignment and close-coupling. The forward end wall of the trailer unit contains a rigid trailer support frame 64 which holds upper and lower guide pins 51 at each side of the trailer unit. The rear end wall of the van unit contains a rigid van support frame 65 which contains the upper and lower holding recesses 61 at each side of the van unit. The locking means 62, located at each side of the van unit for locking the trailer guide pins 51 in the holding recesses 61, include upper and lower locking pins 66 at each end which are slideably confined in the van vertical frame 65 adjacent to upper and lower holding recesses 61. The locking means 62 further include upper and lower linear actuators 67, which preferably are hydraulic cylinders, and an actuator motive means 68. Locking pins 66 are pivotally mounted on the ends of the cylinder rods of the linear actuators 67 so that they may easily enter the apertures 56 of the guide pins 51. The locking means 62 are pivotally mounted on trunions which are mounted in brackets 69 which are attached to each side of the support frame 65. The actuator motive means 68 comprise a motor unit and a pump for pumping hydraulic fluid into the hydraulic cylinders of the linear actuators 67. Alternatively, mechanical actuators may be used. The locking pins 66 preferably have a conical configuration as shown, and are sized to fit within the apertures 56 of the guide pins 51 of the trailer unit. The locking pins 66 and the apertures 56 may, of course, have an alternate configuration. A sealing gasket 42, as shown in FIG. 9 and discussed hereinabove, is secured to the front end wall and the bottom of the cab-over profile of the trailer unit, but the gasket is not shown in FIGS. 14-17 for purposes of clarity.

Figure 15:
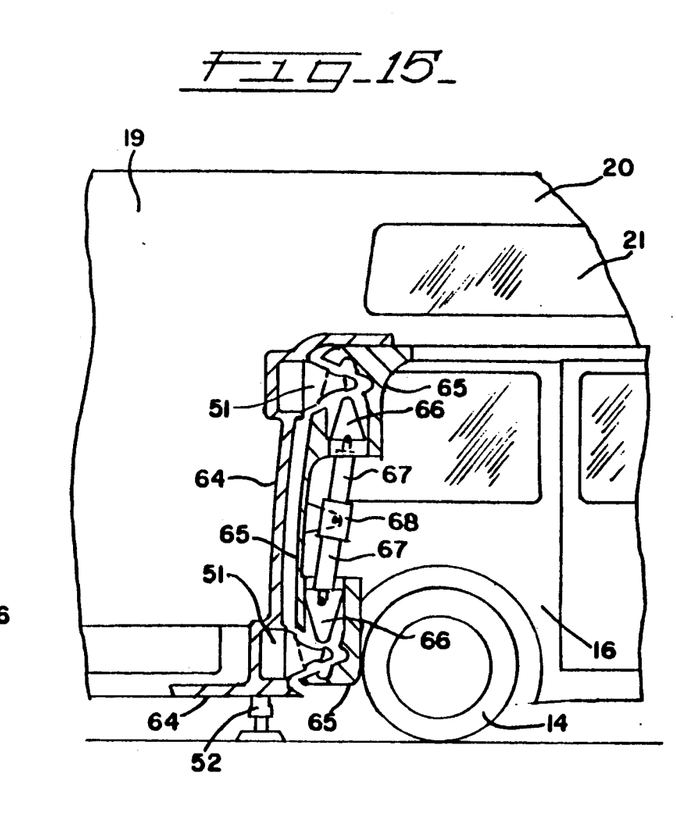
FIG. 15 is a simplified schematic cut-away elevational view similar to FIG. 14, but showing the driven vehicle unit and the trailer unit in alignment and in mating position for coupling.

FIG. 15 is a simplified schematic elevational view similar to FIG. 14, but showing the driven vehicle unit or van and the trailer unit in alignment and substantially in mating position for coupling. It will be noted that the van unit has backed up against the forward wall of the trailer unit so that the guide pins 51 have entered the holding receptacles or recesses 61. The locking pins 66 which are confined in the van vertical frame 65 are above and below the apertures 56 of the guide pins 51, ready to be hydraulically or mechanically forced into the apertures 56.

Figure 16:
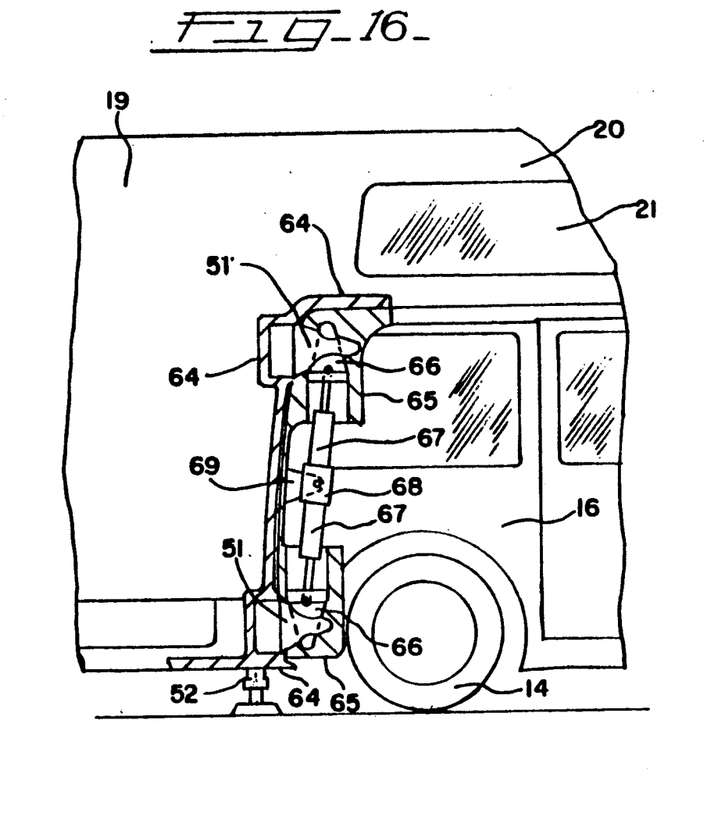
FIG. 16 is a simplified schematic cut-away elevational view similar to FIG. 15, but showing the units close-coupled and ready for movement as a unitary motor home assembly.

FIG. 16 is a simplified schematic elevational view similar to FIG. 15, but showing the units close-coupled and ready for movement as a unitary motor home assembly. The guide pins 51 have been locked within the recesses 61 by the movement of the locking pins 66 into the conical apertures 56 of the forward portion of the guide pins 51. In this configuration, the van unit and the trailer unit are ready for transport as a unitary vehicle, the trailer and van units being completely close-coupled together. A gasket 42 is compressed between the van and the trailer units to provide a sealed joint between the units, as previously discussed hereinabove. The locking pins are fully engaged and electrical connection is now made between the van unit and the trailer unit. The jack stands 52 can now be raised up and into the frame 64 of the trailer unit, and the "pop-out" door panels of the forward wall of the trailer unit and the rear wall of the van unit may be removed and stored in the trailer. A rectangular gasket, not shown in the Figures, is positioned around the interconnecting doors to provide a leakproof weather seal between the coupled van and trailer units. The motor home assembly is now ready for transport as a unitary vehicle.

Figure 17:
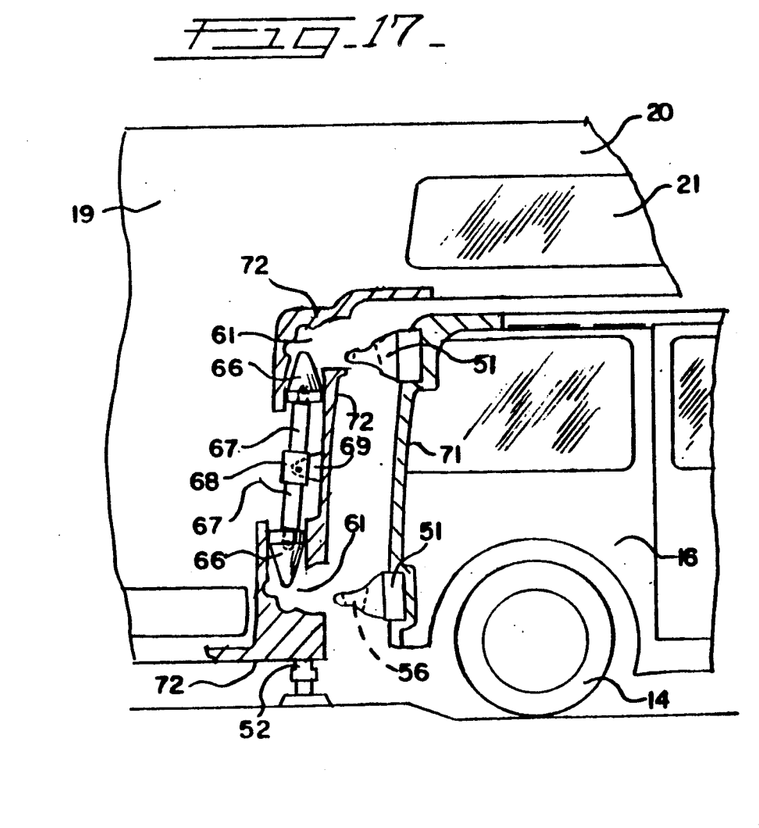
FIG. 17 is a simplified schematic cut-away elevational view similar to FIG. 14, but with the elements of the coupling or hitch reversed so that the guide pins or cones are mounted on the rear end wall of the vehicle unit instead of the forward end wall of the trailer unit, while the holding recesses or receptacles and the locking elements are mounted in the forward end wall of the trailer unit instead of the rear end wall of the vehicle unit.

FIG. 17 shows a simplified schematic elevational view similar to FIG. 14, but with the elements of the coupling or hitch reversed so that the guide pins 51 are mounted in the rear end wall of the vehicle unit instead of the forward end wall of the trailer unit. The guide pins 51 are mounted in a rigid van support frame 71 which holds the guide pins in place. The locking elements are mounted in the forward end wall of the trailer unit instead of the rear end wall of the vehicle unit. A rigid support frame 72 in the trailer unit holds the recesses 61 for the guide pins 51 which are mounted on the rear wall 17 of the van. The rigid trailer support frame 72 also has the trunion bracket 69 upon which is pivotally mounted the various elements of the locking means 62 for locking the van guide pins 51 in the trailer holding recesses 61. The elements of the locking means 62 are the same as described in the foregoing discussion in relationship to FIGS. 14, 15 and 16 with the same element numbers being utilized.

In view of the foregoing discussion in regard to FIGS. 11-17, it will be now be appreciated that the coupling unit or hitch for the rigid motor home assembly is easily aligned, connected and operated because the steerable front and rear wheels of the van unit provide enhanced maneuverability. The two units also are easily uncoupled and separated from one another, thus leaving the van unit to be utilized as an independent vehicle once the motor home trailer unit is parked on a suitable location.

In the foregoing discussion related to FIGS. 11-17, it will be noted that the coupling means or hitch of the vehicle-trailer assembly includes guide pins and holding receptacles or recesses which are located at the upper and lower corners of the end walls adjacent the side walls. However, the vehicle and trailer units may be coupled together by fewer or by more guide pins and holding recesses with an equivalent number of locking pins. If only two guide pins and holding receptacles are used, it is preferable that they be located at the bottom corners of the end walls and that a plurality of the locking elements 33 and 34 (discussed hereinabove in regard to FIGS. 1, 2, 6 and 7) be used to hold the cab-over portion of the trailer to the roof of the vehicle. However, a preferred embodiment is the use of at least two spaced apart and projecting guide elements or pins 51 adjacent each side of one of the units at the bottom and the top of the end wall thereof, and at least two corresponding spaced apart connector holding recesses or receptacles 61 adjacent each side of the other of the units at the top and bottom of the end wall thereof, with a corresponding number of the movable locking elements or pins 66.

In light of the foregoing disclosure, further alternative embodiments of the inventive coupling unit or hitch will undoubtedly suggest themselves to those skilled in the art. It is thus intended that the disclosure be taken as illustrative only, and that it not be construed in any limiting sense. Modifications and variations may be resorted to without departing from the spirit and the scope of this invention, and such modifications and variations are considered to be within the purview and the scope of the appended claims.

I claim:

1. In a motor home assembly comprising a motor vehicle unit including a rear wall and having steerable front wheels and selectively steerable rear wheels, a motor home trailer unit including at least one pair of wheels and having a front wall positioned adjacent said vehicle unit rear wall, and cooperating coupling means between said vehicle unit and said trailer unit to selectively close-couple said units together as one rigid assembly in sealed relationship one with the other, said cooperating coupling means including two spaced apart and forward projecting connector guide elements adjacent each side of said trailer unit at the bottom and the top of the front wall thereof, and corresponding spaced apart connector receptacles adjacent each side of said vehicle unit at the bottom and the top of the rear wall thereof, said connector guide elements detachably engaging and locked within said connector receptacles by corresponding movable locking elements when said units are coupled in rigid assembly, the improvement which comprises:
   (a.) said connector guide elements each including a locking receptacle for receiving a corresponding movable locking element for locking engagement;
   (b.) each connector guide element locking receptacle comprising a conical aperture passing through said connector guide element;
   (c.) each movable locking element being pivotally mounted on motive means and having a conical forward section;
   (d.) each connector guide element locking conical aperture being conically sized and shaped to receive and retain the conical forward section of said corresponding movable locking element in a mated locking engagement upon activation of said motive means; and,
   (e.) said motive means including actuator motive means mounted at each side of said vehicle between said top and bottom connector receptacles, and upper and lower actuator means movably connected to said actuator motive means for moving upper and lower locking elements into and out of locking engagement with corresponding connector guide element conical apertures, and means pivotally mounting said movable locking elements to the corresponding actuator means.

2. A motor home assembly according to claim 1 wherein said motor vehicle unit has a four wheel drive.

3. A motor home assembly according to claim 1 wherein each connector guide element includes a forward projecting conical portion and each corresponding connector receptacle comprises a conical recess sized and shaped to receive said guide element conical portion.

4. A motor home assembly according to claim 3 wherein each projecting conical portion contains a locking conical aperture for receiving a movable locking element in locking engagement when said conical portion is engaged in the corresponding connector receptacle.

5. A motor home assembly according to claim 1 wherein said actuator means includes a cylinder having a rod pivotally connected to a corresponding movable locking element.

6. In a vehicle-trailer assembly comprising a motor vehicle unit including a rear wall and having steerable front wheels and selectively steerable rear wheels, a trailer unit including at least one pair of wheels and having a front wall positioned adjacent said vehicle unit rear wall, and cooperating coupling means between said vehicle unit and said trailer unit to selectively close-couple said units together as one rigid assembly in sealed relationship one with the other, said cooperating coupling means including at least one projecting connector guide element adjacent each side of one of said units at the bottom of said wall thereof, and corresponding connector receptacles adjacent each side of the other side of said units at the bottom of said wall thereof, said connector guide elements detachably engaging and locked within said connector receptacles by corresponding movable locking elements when said units are coupled in rigid assembly, the improvement which comprises:
- (a.) said connector guide elements each including a locking receptacle for receiving a corresponding movable locking element for locking engagement;
- (b.) each connector guide element locking receptacle comprising a conical aperture passing through said connector guide element;
- (c.) each movable locking element being pivotally mounted on motive means and having a conical forward section; and,
- (d.) each connector guide element locking conical aperture being conically sized and shaped to receive and retain the conical forward section of said corresponding movable locking element in a mated locking engagement upon activation of said motive means.

7. A vehicle-trailer assembly according to claim 6 wherein said motor vehicle unit has a four wheel drive.

8. A vehicle-trailer assembly according to claim 6 wherein each connector guide element includes a forward projecting conical portion and each corresponding connector receptacle comprises a conical recess sized and shaped to receive said guide element conical portion.

9. A vehicle-trailer assembly according to claim 8 wherein each projecting conical portion contains a locking conical aperture for receiving a movable locking element in locking engagement when said conical portion is engaged in the corresponding connector receptacle.

10. A vehicle-trailer assembly according to claim 6 wherein said motive means includes actuator means for moving said locking elements into and out of locking engagement with corresponding connector guide element conical apertures.

11. A vehicle-trailer assembly according to claim 10 wherein said actuator means includes a cylinder having a rod pivotally connected to a corresponding movable locking element.

12. In a vehicle-trailer assembly comprising a motor vehicle unit including a rear wall and having steerable front wheels and selectively steerable rear wheels, a trailer unit including at least one pair of wheels and having a front wall positioned adjacent said vehicle unit rear wall, and cooperating coupling means between said vehicle unit and said trailer unit to selectively close-couple said units together as one rigid assembly in sealed relationship one with the other, said cooperating coupling means including at least two spaced apart and projecting connector guide elements adjacent each side of one of said units at the bottom and the top of said wall thereof, and corresponding spaced apart connector receptacles adjacent each side of the other of said units at the bottom and the top of said wall thereof, said connector guide elements detachably engaging and locked within said connector receptacles by corresponding movable locking elements when said units are coupled in rigid assembly, the improvement which comprises:
- (a.) said connector guide elements each including a locking receptacle for receiving a corresponding movable locking element for locking engagement;
- (b.) each connector guide element locking receptacle comprising a conical aperture passing through said connector guide element;
- (c.) each movable locking element being pivotally mounted on motive means and having a conical forward section; and,
- (d.) each connector guide element locking conical aperture being conically sized and shaped to receive and retain the conical forward section of said corresponding movable locking element in a mated locking engagement upon activation of said motive means; and, p1 (e.) each motive means including actuator motive means mounted at each side of said other of said units between said top and bottom connector receptacles, and upper and lower actuator means movably connected to said actuator motive means for moving upper and lower locking elements into and out of locking engagement with corresponding connector guide element conical apertures, and means pivotally mounting said movable locking elements to the corresponding actuator means.

13. A vehicle-trailer assembly according to claim 12 wherein said motor vehicle unit has a four wheel drive.

14. A vehicle-trailer assembly according to claim 12 wherein each connector guide element includes a forward projecting conical portion and each corresponding connector receptacle comprises a conical recess sized and shaped to receive said guide element conical portion.

15. A vehicle-trailer assembly according to claim 14 wherein each projecting conical portion contains a locking conical aperture for receiving a movable locking element in locking engagement when said conical portion is engaged in the corresponding connector receptacle.

16. A vehicle-trailer assembly according to claim 12 wherein said actuator means includes a cylinder having a rod pivotally connected to a corresponding movable locking element.

* * * * *